(12) United States Patent
Taniguchi

(10) Patent No.: US 10,992,347 B2
(45) Date of Patent: Apr. 27, 2021

(54) PULSED WIRELESS POWER DEVICE AND METHOD

(71) Applicant: KABUSHIKI KAISHA TOSHIBA, Tokyo (JP)

(72) Inventor: Kentaro Taniguchi, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 16/808,136

(22) Filed: Mar. 3, 2020

(65) Prior Publication Data

US 2021/0067199 A1 Mar. 4, 2021

(30) Foreign Application Priority Data

Aug. 28, 2019 (JP) .............................. JP2019-155775

(51) Int. Cl.
*H02J 50/10* (2016.01)
*H04B 5/00* (2006.01)
*H02J 50/80* (2016.01)

(52) U.S. Cl.
CPC ............ *H04B 5/0037* (2013.01); *H02J 50/10* (2016.02); *H02J 50/80* (2016.02); *H04B 5/0031* (2013.01)

(58) Field of Classification Search
CPC ........ H02J 50/10; H02J 50/80; H04B 5/0031; H04B 5/0037
USPC ........................................................ 307/104
See application file for complete search history.

(56) References Cited

U.S. PATENT DOCUMENTS

| 2012/0280574 A1 | 11/2012 | Hur et al. |
| 2014/0217967 A1 | 8/2014 | Zeine et al. |
| 2014/0339909 A1* | 11/2014 | Sugawara ............... H02J 7/025 307/104 |
| 2015/0042526 A1 | 2/2015 | Zeine |
| 2020/0076239 A1 | 3/2020 | Taniguchi et al. |
| 2020/0185975 A1 | 6/2020 | Taniguchi |

FOREIGN PATENT DOCUMENTS

| JP | 2016512677 A | 4/2016 |
| JP | 2020036519 | 3/2020 |

OTHER PUBLICATIONS

U.S. Appl. No. 16/299,102, filed Mar. 11, 2019, First Named Inventor: Kentaro Taniguchi, Title: Electronic Apparatus.

* cited by examiner

*Primary Examiner* — William Hernandez
(74) *Attorney, Agent, or Firm* — Holtz, Holtz & Volek PC

(57) ABSTRACT

According to one embodiment, an electronic device includes processor circuitry configured to control a signal detection module to detect a wireless signal of a wireless communication system, and control a power supply module to supply power to a power reception device with electromagnetic waves. When the wireless signal is not detected during a first period, the power is supplied during a second period. When the wireless signal is not detected during a third period different from the first period, the power is supplied during a fourth period different from the second period. A second ratio of the fourth period to the third period is the same as a first ratio of the second period to the first period.

12 Claims, 7 Drawing Sheets

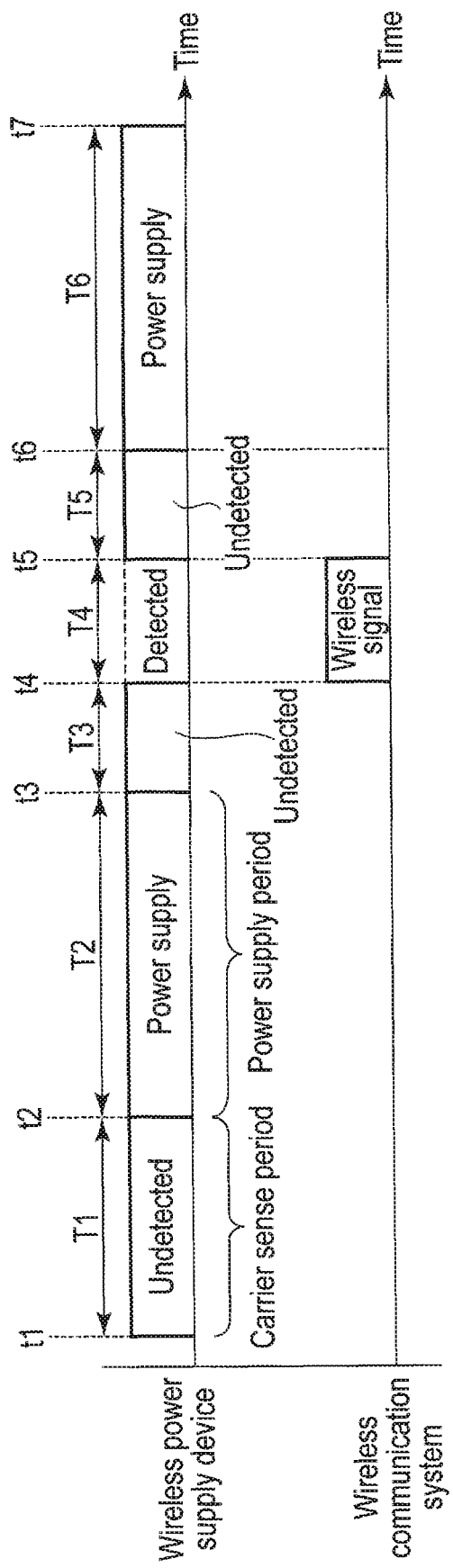
F I G. 5

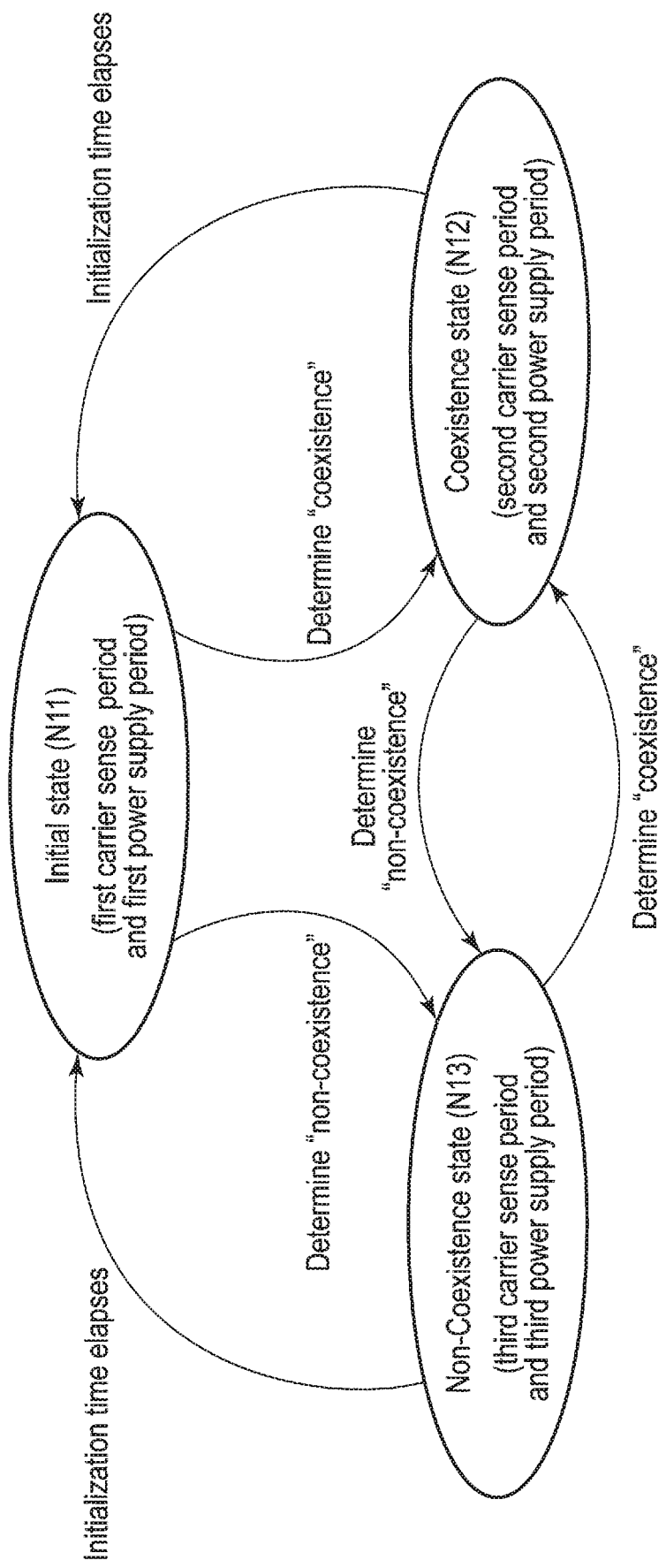
F I G. 12

PULSED WIRELESS POWER DEVICE AND METHOD

CROSS-REFERENCE TO RELATED APPLICATIONS

This application is based upon and claims the benefit of priority from Japanese Patent Application No. 2019-155775, filed Aug. 28, 2019, the entire contents of which are incorporated herein by reference.

FIELD

Embodiments described herein relate generally to an electronic device and a method.

BACKGROUND

Recently, a technology capable of transmitting power to power reception devices (i.e., performing power supply to power reception devices) by transmitting electromagnetic waves (for example, microwaves) for power supply from electronic devices called wireless power supply devices has been focused.

Such a technology is expected to dramatically improve convenience since the power supply is freed from physical constraints in supplying power to the electronic devices in a wired manner as in the past.

Incidentally, to supply power to power reception devices with efficiency, wireless power supply devices need to transmit electromagnetic waves of high power level.

However, when electromagnetic waves of a high power level are transmitted from wireless power supply devices, interference may occur with an existing wireless communication system.

In contrast, if the time to supply power by wireless power supply devices is reduced, interference with an existing wireless communication system can be suppressed but the power supply efficiency may be lowered.

BRIEF DESCRIPTION OF THE DRAWINGS

FIG. 5 is a chart illustrating an outline of operations of the wireless power supply device.

FIG. 12 is a diagram illustrating state transition of the wireless power supply device in a case of returning the ratio to an initial value at each certain time.

DETAILED DESCRIPTION

In general, according to one embodiment, an electronic device includes processor circuitry configured to control a signal detection module to detect a wireless signal of a wireless communication system, and control a power supply module to supply power to a power reception device with electromagnetic waves. When the wireless signal is not detected during a first period, the power is supplied during a second period. When the wireless signal is not detected during a third period different from the first period, the power is supplied during a fourth period different from the second period. A second ratio of the fourth period to the third period is the same as a first ratio of the second period to the first period.

Various embodiments will be described hereinafter with reference to the accompanying drawings.

First Embodiment

First, a first embodiment will be described. A wireless power supply system according to the present embodiment includes an electronic device (hereinafter referred to as a wireless power supply device) having a function of transmitting power (supplying power) to another electronic device (hereinafter referred to as a power reception device) with electromagnetic waves, and the power reception device receiving the power transmitted from the wireless power supply device with electromagnetic waves.

The wireless power supply device transmits the power to the power reception device with the electromagnetic waves of a specific frequency band and, in this case, may interfere with an existing wireless communication system using frequency bands which are the same as or close to this frequency band. For this reason, the wireless power supply device according to the present embodiment is configured to suppress interference with the existing wireless communication system.

The wireless communication system includes, for example, wireless communication devices including a base station, a terminal device, and the like that execute wireless communications.

A relationship between a wireless power supply device according to the present embodiment and an existing wireless communication system will be described with reference to FIG. 1. The wireless power supply device can transmit power to the power reception device with electromagnetic waves as described above, and the wireless power supply device is assumed to transmit power with, for example, frequency band F1. In contrast, the wireless communication system is assumed to execute wireless communication with, for example, frequency band F2.

Figure 1:
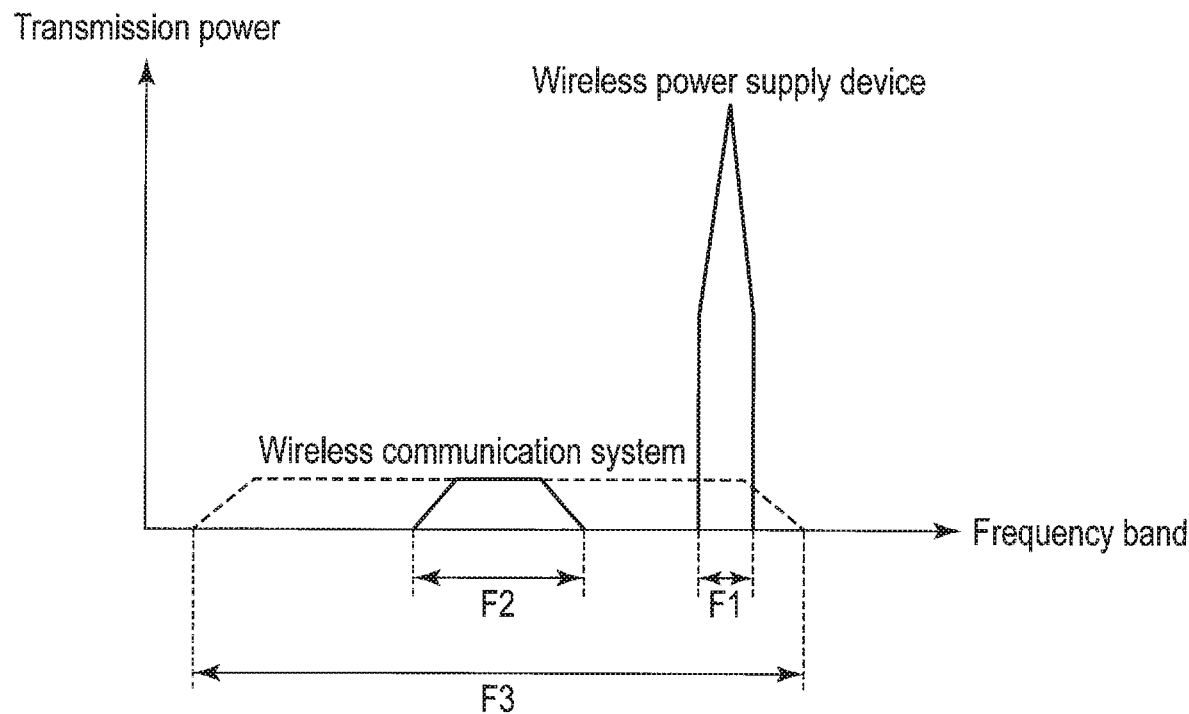
FIG. 1 is a diagram illustrating a relation between a wireless power supply device according to the first embodiment and an existing wireless communication system.

In FIG. 1, a vertical axis indicates the transmission power, and the power level of the electromagnetic waves transmitted from the wireless power supply device when the power is transmitted is very high as compared with, for example, the power level of the wireless signal transmitted in the wireless communication system.

In addition, in FIG. 1, a horizontal axis indicates the frequency band and, if a difference in frequency between the frequency band F1 used by the wireless power supply device and the frequency band F2 used in the wireless communication system is small (i.e., the wireless communication system uses the frequency band F2 close to the frequency band F1 used by the wireless power supply device), power supply (power transmission) performed by the wireless power supply device may give interference to the wireless communication system.

Furthermore, since a wireless communication device constituting the wireless communication system often includes an antenna capable of receiving a wireless signal of a frequency band F3 broader than the frequency band F2 used by the wireless communication system, the wireless communication system may be more influenced by the wireless power supply device.

Therefore, power supply of the wireless power supply device needs to be performed by considering use conditions of not only the frequency band F1 used by the wireless power supply device, but also the close frequency band.

Thus, the wireless power supply device according to the present embodiment scans at least a frequency band used by the wireless power supply device or a frequency band close to this frequency band and executes carrier sense in the frequency band, before performing power supply, and thereby checks whether the wireless communication system using the frequency band exists or not.

In the present embodiment, "carrier sense" indicates, for example, to detect (sense) existence of the wireless signal transmitted in the wireless communication system (i.e., to check whether the wireless signal is detected or not), and "the wireless signal is detected" may indicate that the wireless signal is continuously detected during a predetermined period. Furthermore, the above-described "carrier sense" may encompass a concept of analyzing (demodulating or decoding) a part or all parts of a wireless signal.

Figure 2:
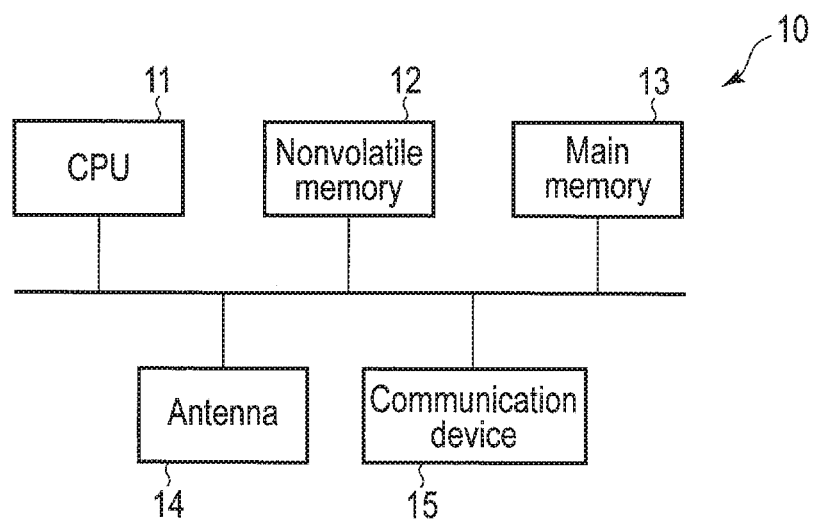
FIG. 2 is a diagram showing an example of a hardware configuration of the wireless power supply device.

Configurations of the wireless power supply device and the power reception device according to the present embodiment will be described below. FIG. 2 shows an example of a hardware configuration of the wireless power supply device. As shown in FIG. 2, a wireless power supply device 10 includes a CPU 11, a nonvolatile memory 12, a main memory 13, a communication device 15, and the like.

The CPU 11 is a hardware processor (processor circuit) which controls operations of each component in the wireless power supply device 10. The CPU 11 executes a program loaded from the nonvolatile memory 12 that is a storage device, onto the main memory 13.

The antenna 14 is configured to transmit electromagnetic waves (power supply signals) to transmit the power in a predetermined frequency band. In addition, the antenna 14 is configured to receive wireless signals of a frequency band that is a target of the carrier sense (i.e., wireless signals transmitted in the wireless communication system). As regards the antenna 14, an antenna to transmit electromagnetic waves for transmitting the power and an antenna to receive wireless signals in the wireless communication system may be provided separately, or only one antenna configured to transmit the electromagnetic waves and to receive wireless signals may be provided. In addition, the antenna 14 may be an array antenna including a plurality of array elements. Furthermore, the antenna 14 may further includes an antenna to execute wireless communication with an external device in addition to the antenna receiving the wireless signals.

The communication device 15 is, for example, a device configured to execute wireless communication with an external device.

Figure 3:
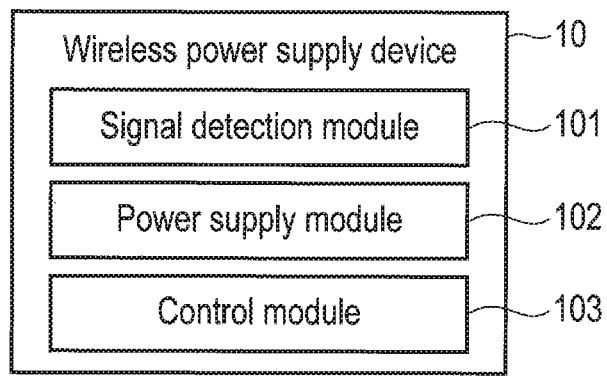
FIG. 3 is a block diagram showing an example of a functional configuration of the wireless power supply device.

FIG. 3 is a block diagram showing an example of a functional configuration of the wireless power supply device 10. As shown in FIG. 3, the wireless power supply device 10 includes a signal detection module 101, a power supply module 102, and a control module 103.

In the present embodiment, a part or all of the signal detection module 101, the power supply module 102, and the control module 103 may be implemented (controlled) by causing the CPU 11 to execute programs, i.e., by software, may be implemented by hardware such as an integrated circuit (IC) and the like, or may be implemented as a combined configuration of software and hardware.

The signal detection module 101 is a functional module that executes the carrier sense. More specifically, the wireless signal transmitted in the wireless communication system (i.e., wireless signal of the wireless communication system) can be received via the antenna 14, and the signal detection module 101 detects a power level (i.e., signal energy) of the received wireless signal. The signal detection module 101 thereby detects presence or absence of the wireless signal.

The power supply module 102 is a functional module that performs power supply (transmits power with electromagnetic waves) to the power reception device, based on the result of detection executed by the signal detection module 101 (i.e., the carrier sense result). When the wireless signal is detected by the signal detection module 101, the power supply module 102 does not perform power supply to avoid giving interference to the wireless communication system. In contrast, when the wireless signal is not detected by the signal detection module 101, the power supply module 102 performs power supply.

The control module 103 is a functional module that manages a period for the carrier sense and the power supply. The control module 103 may include a function of controlling (changing) the period for the carrier sense and the power supply.

Figure 4:
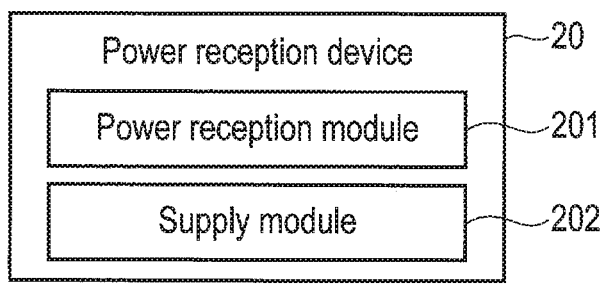
FIG. 4 is a block diagram showing an example of a functional configuration of a power reception device.

FIG. 4 is a block diagram showing an example of a functional configuration of the power reception device. As shown in FIG. 4, the power reception device 20 includes a power reception module 201 and a supply module 202.

The power reception device 20 includes an antenna capable of receiving the electromagnetic waves transmitted from the wireless power supply device 10, and the power reception module 201 receives the power transmitted with the electromagnetic waves received via the antenna.

The supply module 202 supplies the power received by the power reception module 201 to each component of the power reception device 20. More specifically, the power reception device 20 includes a battery or a capacitor (power storage unit) capable of storing power, and the supply module 202 charges the power storage unit by supplying the power received by the power reception module 201 to the power storage unit.

The power reception device 20 may be configured to transmit to the wireless power supply device 10, for example, a power amount required for the power reception device 20 (i.e., a required received power amount) or a remaining battery and the like, though not shown in FIG. 4.

In addition, a hardware configuration of the power reception device 20 will not be described in detail, but the power reception device 20 may include, for example, a CPU (processor circuit), a nonvolatile memory, a main memory, a sensor, a camera, an antenna, a communication device, a power storage unit, and the like.

Next, an outline of operations of the wireless power supply device 10 according to the present embodiment will be described with reference to FIG. 5.

First, for example, the signal detection module 101 starts carrier sense at time t1. In this case, a period in which the wireless signal is not detected (hereinafter referred to a signal undetected period) is counted by the control module 103, and the signal detection module 101 ends carrier sense at time t2 at which the signal undetected period T1 counted by the control module 103 reaches a predetermined period (hereinafter referred to as a carrier sense period). The carrier sense period corresponds to a period in which it needs to be confirmed that the wireless signal is not detected to perform power supply.

When the carrier sense is ended at time t2, the power supply module 102 starts power supply (i.e., power transmission) at time t2. In this case, a period in which power supply is performed by transmitting the power (hereinafter referred to as a power transmission period) is counted by the control module 103, and the power supply module 102 ends power supply at time t3 at which the power transmission period T2 counted by the control module 103 reaches a predetermined period (hereinafter referred to as a power supply period).

When the power supply is ended at time t3, the signal detection module 101 executes carrier sense again at time t3.

It is assumed here that the wireless signal is not detected in period T3 from time t3 to time t4, but the wireless signal is detected in period T4 from time t4 to time t5, as shown in FIG. 5. In this case, at time t4, the control module 103 temporarily stops counting the signal undetected period started at time t3.

When the period T4 from time t4 to time t5 has elapsed in a state in which the wireless signal is detected and when the wireless signal is not detected again at time t5, the control module 103 restarts counting the signal undetected period temporarily stopped. In this case, the carrier sense is ended at time t6 at which the sum of the signal undetected period T3 and the signal undetected period T5 reaches the carrier sense period.

When the carrier sense is ended at time t6, the power supply module 102 performs power supply in period T6 (i.e., power supply period) from time t6 to time t7.

As described above, the wireless power supply device 10 suppresses interference with the existing wireless communication system caused by the power supply (i.e., power transmission using electromagnetic waves), by performing power supply when the wireless signal is not detected in the carrier sense period.

Even if the wireless signal is detected while executing the carrier sense, the power supply is performed when a sum of the above signal undetected periods reaches the carrier sense period. In contrast, when the wireless signal is continuously detected and the signal undetected period does not reach the carrier sense period, the power supply is not performed, though not shown in FIG. 5. Even if the wireless signal is transmitted to the wireless communication system in the period in which the power supply is performed, the power supply is continued.

Incidentally, when the wireless power supply device 10 according to the present embodiment operates as shown in FIG. 5 described above, coexistence of the wireless power supply device 10 and the existing wireless communication system can be attempted, but it is not considered that the wireless power supply device 10 can certainly avoid interference affected to the wireless communication system. The degree of interference with the wireless communication system depends on the accuracy of detecting the wireless signal at the signal detection module 101.

More specifically, for example, when the existing wireless communication system does not transmit a wireless signal in a period in which carrier sense is executed (i.e., a carrier sense period), the wireless signal is not detected by the carrier sense, and power supply is thereby performed even if the wireless communication system exists. That is, when a preset carrier sense period is short, a situation that the wireless signal of the wireless communication system to be originally detected cannot be detected may occur.

In contrast, when the carrier sense period is long, opportunities to detect the wireless signal of the wireless communication system are increased and an influence of noise included in the wireless signal (received signal) can be suppressed by a long-time integral process or the like, and an accuracy of detecting the wireless signal can be thereby improved. According to this, the interference of the wireless power supply device 10 with the wireless communication system can be avoided at a high probability.

In contrast, since the wireless power supply device 10 aims to perform power supply to the power reception device 20, it is desirable to improve the power supply efficiency. However, if the carrier sense period is extended as described above, the power supply period becomes shorter and the power supply efficiency is lowered (deteriorated).

The power supply period needs to be extended to improve the power supply efficiency but, if the power supply period is extended, opportunities to detect the wireless signal of the wireless communication system are reduced and the accuracy of detecting is deteriorated. As a result, the interference with the wireless communication system can hardly be avoided. In other words, when the power supply period is long, the wireless communication system can hardly use the wireless channel and an influence of interference to the wireless communication system becomes larger.

That is, balance of the carrier sense period and the power supply period is important to implement appropriate coexistence of the wireless power supply device 10 and the existing wireless communication system.

The present embodiment implements appropriate balance of the carrier sense period and the power supply period, and manages the carrier sense period and the power supply period so as to set the power supply period to be long when the carrier sense period is long and to set the power supply period to be short when the carrier sense period is short.

More specifically, for example, when the carrier sense period is long, the accuracy of sensing the wireless signal is high as described above. Therefore, when the wireless signal is not detected in such a carrier sense period, the power supply period is set to be long since it can be presumed that an interference may not be given to the existing wireless communication system.

In contrast, since the accuracy of detecting the wireless signal is low in a case where the carrier sense period is short, possibilities of giving an interference to the wireless communication system cannot be neglected even when the wireless signal is not detected in such a carrier sense period. In this case, the power supply period is set to be short.

That is, the present embodiment manages (controls) the carrier sense period and the power supply period, from the above viewpoint, such that ratio N of the power supply period to the carrier sense period (=power supply period/carrier sense period) is constant. For example, in the example shown in FIG. 5, the power supply period (for example, period T2) is controlled to be a multiple of N of the carrier sense period (for example, period T1). N is a real number.

An example of the procedure of the wireless power supply device 10 according to the present embodiment will be described below with reference to the flowchart of FIG. 6.

First, the control module 103 sets the above-described carrier sense period (step S1). The carrier sense period set in step S1 is assumed to be preset in the wireless power supply device 10. The carrier sense period is determined based on, for example, specifications of the wireless power supply device 10, an environment where the wireless power supply device 10 is installed, specifications of the existing wireless communication system, and the like.

Next, the control module 103 sets the above-described power supply period, based on the carrier sense period set in step S1 (step S2). In this case, the control module 103 sets a period obtained by multiplying the carrier sense period by the ratio N as the power supply period.

According to this, for example, even if different carrier sense periods are set in step S1, the power supply period is set such that the ratio to the carrier sense periods is N (i.e., constant) in step S2.

The ratio (period ratio) N in the present embodiment will be described. In the present embodiment, a comparatively small ratio N is used when the interference of the wireless power supply device 10 to the wireless communication system is assumed to be large, and a comparatively large ratio N is used when the interference is assumed to be small.

Figure 7:
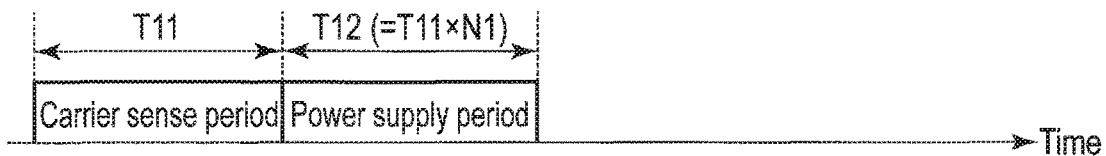
FIG. 7 is a chart showing an example of a carrier sense period and a power supply period in a case of using a comparatively small ratio.
Figure 8:
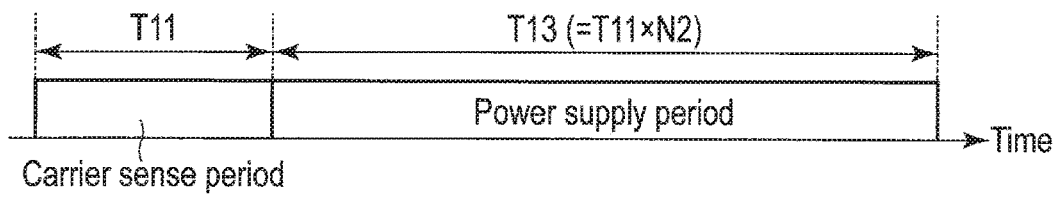
FIG. 8 is a chart showing an example of a carrier sense period and a power supply period in a case of using a comparatively large ratio.

FIG. 7 shows an example of a carrier sense period and a power supply period in a case of using a comparatively small ratio N (hereinafter referred to as ratio N1). FIG. 8 shows an example of a carrier sense period and a power supply period in a case of using a comparatively large ratio N (hereinafter referred to as ratio N2).

When the interference of the wireless power supply device 10 to the wireless communication system is assumed to be large as described above, the power supply period is made to be short by using the ratio N1 as shown in FIG. 7. More specifically, when the carrier sense period is T11, a power supply period T12 is T1×N1. In this case, giving the interference to the wireless communication system can be suppressed since the power supply can be ended in a short period.

In contrast, when the interference of the wireless power supply device 10 to the wireless communication system is assumed to be small, the power supply period is made to be long by using the ratio N2 as shown in FIG. 8. More specifically, when the carrier sense period is T11, a power supply period T13 is T11×N2. In this case, the power supply efficiency can be improved since the power supply can be performed for a long period.

Whether the interference of the wireless power supply device 10 to the wireless communication system is large or small can be determined based on, for example, specifications of the wireless power supply device 10, specifications of the wireless communication system, and the like.

The specifications of the wireless power supply device 10 include, for example, a place of installation of the wireless power supply device 10, a frequency band of the electromagnetic wave transmitted from the wireless power supply device 10, the power level of the electromagnetic wave, the area of supplying the power by the wireless power supply device 10 (i.e., a reach area of the electromagnetic wave), and the like. For example, information on the specifications (specification values) of the wireless power supply device 10 may be preliminarily managed inside the wireless power supply device 10.

In addition, the specifications of the wireless communication system include, for example, a place of installation of each of the wireless communication devices constituting the wireless communication system, the number of the wireless communication devices, the frequency band (width) of the wireless signal transmitted in the wireless communication system, the power level (signal energy) of the wireless signal, the frame length (signal length) of the wireless signal, the signal transmission frequency of the wireless signal, signal type (frame type) of the wireless signal, a permissible delay time in the wireless communication system, and the like.

For example, the already known information, of the information on the specifications (specification values) of the wireless communication system may be preliminarily managed inside the wireless power supply device 10. For example, the frequency band of the wireless signal is already known since it is predetermined as a communication standard.

In contrast, the information which is not yet known, of the information (specification values) on the specifications of the wireless communication system, can be acquired by analyzing the wireless signal transmitted in the wireless communication system (i.e., wireless signal detected by the signal detection module 101). More specifically, since the frame length of the wireless signal transmitted in the wireless communication system and the transmission frequency are considered to be varied in accordance with environment, they are estimated from the wireless signal (observation data) detected by the signal detection module 101.

The information on the specifications of the wireless communication system may be estimated based on the size and the time width of the power level of the wireless signal detected by the signal detection module 101 or may be estimated based on results of demodulating several parts (for example, a header part, a data part, or the like) or all parts of the wireless signal.

Furthermore, the information (specification values) on the specifications of the wireless communication system may be values estimated from a single wireless signal or may be analytic values (for example, minimum value, maximum value, middle value, mean value, distributed value, standard deviation, and the like) obtained by statistically analyzing a plurality of wireless signals (i.e., detection results).

Estimating the information on the specifications of the wireless communication system from the wireless signal has been described, but the information on the specifications of the wireless communication system may be received directly from the wireless communication device constituting the wireless communication system.

According to the specifications of the wireless power supply device 10 and the specifications of the wireless communication system as described above, it can be determined that, for example, the wireless communication device constituting the wireless communication system is installed near the wireless power supply device 10, the number of wireless communication devices is large, the frequency band used by the wireless communication system is the same as or close to the frequency band used by the wireless power supply device 10, or the like. In these cases, a comparatively small ratio N may be adopted since it is estimated that the interference of the wireless power supply device 10 with the wireless communication system may become larger.

Similarly, according to the specifications of the wireless power supply device 10 and the specifications of the wireless communication system as described above, it can be determined that, for example, the wireless communication device constituting the wireless communication system is installed remote from the wireless power supply device 10, the frequency band used by the wireless communication system is remote from the frequency band used by the wireless power supply device 10, or the like. In these cases, a comparatively large ratio N may be adopted since it is estimated that the interference of the wireless power supply device 10 with the wireless communication system may become smaller.

Using the specifications of the wireless power supply device 10 and the specifications of the wireless communication system to determine (set) the ratio N used in the wireless power supply device 10 has been described but, for example, the required power reception amount, battery information (remaining battery) and the like received from the power reception device 20 may be used other than the specifications.

As a concrete example of the ratio N, for example, when the wireless power supply device 10 and the wireless communication system exist together in the same chamber, the ratio N is set to 1 (i.e., N=1) since the interference is assumed to be large. In contrast, when the wireless power supply device 10 and the wireless communication system exist in different chambers partitioned by a wall in the same building, the ratio N is set to 2 (i.e., N=2) since the interference is assumed to be small. In addition, when the wireless power supply device 10 and the wireless communication system exist in adjacent (i.e., different) buildings, the ratio N may be set to a further large value (for example, N23).

In addition, for example, the ratio N is set to 1 when the frequency band used by the wireless power supply device 10 and the frequency band used by the wireless communication system are the same (i.e., the same channel), and the ratio N is set to 2 when the frequency bands are close (i.e., adjacent channels). When the frequency band used by the wireless power supply device 10 is remote from the frequency band used by the wireless communication system, the ratio N may be 3 or more.

Furthermore, for example, the ratio N may be set to 1 when the wireless communication system executes wireless communications in which delay is not permitted such as conversation and the like, and the ratio N may be set to 2 or more when the wireless communication system executes wireless communications in which delay is comparatively permitted such as transmission of messages and the like.

The ratio N can be determined in consideration of, for example, results of experiments, computer simulation, and the like.

The descriptions return again to FIG. 6, and the signal detection module 101 starts the carrier sense (step S3). As described above, when the carrier sense is started by the signal detection module 101, the control module 103 counts the signal undetection period.

The signal detection module 101 determines whether the wireless signal is detected or not (step S4). When the signal detection module 101 detects the energy of the wireless signal, a specific signal pattern, and the like via the antenna 14, the signal detection module 101 determines that the wireless signal is detected. In contrast, when the signal detection module 101 does not detect the energy of the wireless signal, a specific signal pattern, or the like, the signal detection module 101 determines that the wireless signal is not detected.

When it is determined that the wireless signal is detected (YES in step S4), counting the above-mentioned signal undetection period is stopped and the process in step S4 is repeated. When it is determined that the wireless signal is not detected in step S4 executed after counting the signal undetection period is stopped, counting the signal undetection period is restarted.

In contrast, when it is determined that the wireless signal is not detected (NO in step S4), the signal detection module 101 determines whether the signal undetection period counted by the control module 103 reaches the carrier sense period set in step S1 or not (step S5).

When it is determined that the signal undetection period does not reach the carrier sense period (NO in step S5), the flow returns to step S4 and the process is repeated.

In contrast, when it is determined that the signal undetection period reaches the carrier sense period (YES in step S5), the signal detection module 101 ends the carrier sense.

Next, the power supply module 102 starts the power supply (step S6). In this case, the power supply module 102 transmits (supplies) the power to the power reception device 20 by transmitting the electromagnetic waves based on a predetermined power level. Thus, the power transmitted by the power supply module 102 is received by the power reception module 201 included in the power reception device 20 and supplied to the battery and the like by the supply module 202. When the power supply is started by the power supply module 102, the control module 103 counts the power transmission period.

The power supply module 102 determines whether the power transmission period counted by the control module 103 reaches the power supply period set in step S2 or not (step S7).

When it is determined that the power transmission period does not reach the power supply period (NO in step S7), the process in step S7 is repeated.

In contrast, when it is determined that the power transmission period reaches the power supply period (YES in step S7), the power supply module 102 ends the power supply.

Figure 6:
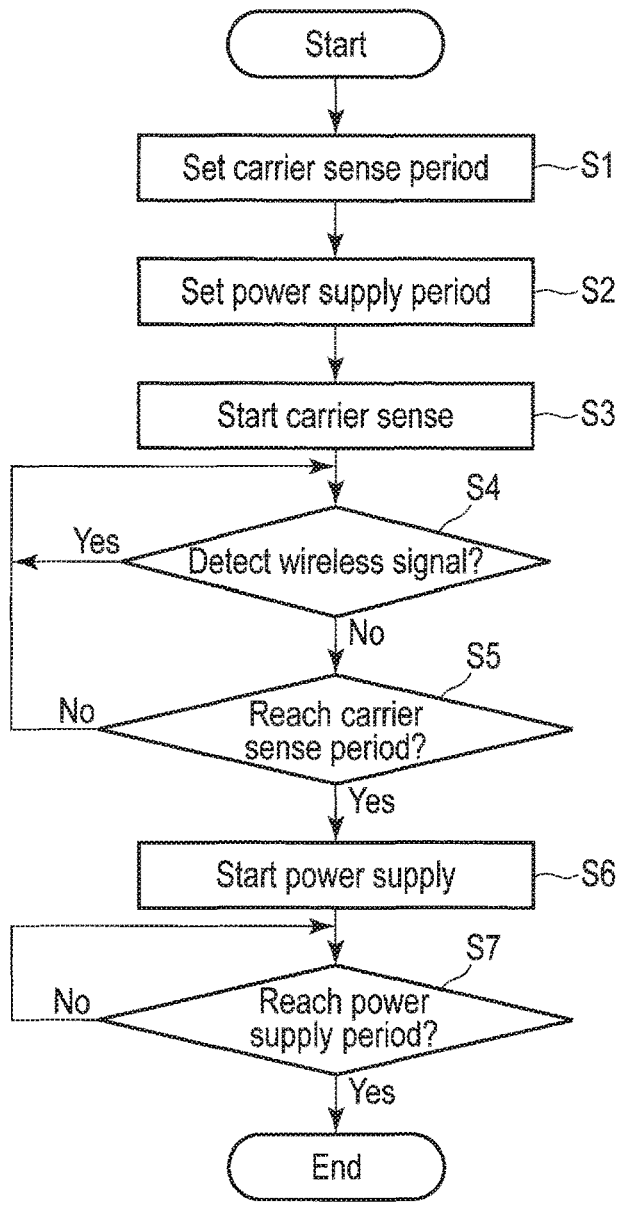
FIG. 6 is a flowchart showing an example of a procedure of the wireless power supply device.

FIG. 6 shows, for example, the processes executed between times t1 to t3 shown in FIG. 5, and the processes shown in FIG. 6 are periodically repeated as shown in FIG. 5.

As described above, in the present embodiment, when the wireless signal is not detected during, for example, a first carrier sense period (first period), the power supply is performed during a first power supply period (second period) and, when the wireless signal is not detected during, for example, a second carrier sense period (third period), the power supply is performed during a second power supply period (fourth period). In this case, a ratio (second ratio) of the second power supply period to the second carrier sense period is the same as the ratio (first ratio) of the first power supply period to the first carrier sense period.

That is, in the wireless power supply device 10 and the power reception device 20 according to the present embodiment, power supply to the power reception device 20 can be performed in a state in which the level of the interference of the wireless power supply device 10 with the wireless communication system is maintained constant, and both the suppression of the interference with the wireless communication system and the improvement of the power supply efficiency can be implemented, by making the ratio N of the carrier sense period to the power supply period constant.

For example, even if the ratio N is set to 1, the influence of the wireless power supply device 10 with the wireless communication system in a case where each of the carrier sense period and the power supply period is 1 ms is different from that in a case where each of the carrier sense period and the power supply period is 10 ms. More specifically, when each of the carrier sense period and the power supply period is 1 ms, the influence to the communication delay becomes small but the packet signal communication in a long frame length (time length) is easily failed. In contrast, when each of the carrier sense period and the power supply period is 10 ms, the influence to the communication delay becomes large but the packet signal communication in a long frame length (time length) can easily be executed.

For this reason, in the present embodiment, (absolute values of) the carrier sense period and the power supply period may be flexibly changed while maintaining the ratio N constant as described above. A process of changing the carrier sense period and the power supply period (hereinafter referred to as a period change process) may be executed by, for example, the control module 103.

The period change process is executed based on, for example, the already known specification (values) of the wireless communication system or detection results (observation results) of the wireless signal detected by the signal detection module 101. The detection results of the wireless signal include the power level of the wireless signal, the detection time (time when the wireless signal is continuously detected), demodulation results of the wireless signal, these statistical analysis results, and the like. The demodulation results of the wireless signal may include traffic information of the wireless communication data obtained by demodulating the wireless signal, the number of wireless communication devices, and the like.

A concrete example of a period changing process will be described below. For example, the first carrier sense period and the first power supply period (i.e., period obtained by multiplying the carrier sense period by the ratio N) is assumed to be set.

For example, when the detection time of the wireless signal detected by the signal detection module 101 is long, the frame length of the wireless signal can be assumed to be long. For this reason, the control module 103 changes the first carrier sense period to the second carrier sense period longer than the first carrier sense period. Furthermore, the control module 103 changes the first power supply period to the second power supply period obtained by multiplying the second carrier sense period by the ratio N. In this case, fair coexistence of the wireless power supply device 10 and the wireless communication system can be implemented by setting the power supply period to be substantially the same as the frame length of the wireless signal.

In addition, in the period change process, not only the frame length of the wireless signal transmitted in the wireless communication system, but the analysis results of the communication protocol in the wireless communication system may be used. More specifically, it is known that when wireless LAN conforming to IEEE802.11 standard is assumed as the wireless communication system, one wireless LAN terminal (wireless communication device) stands by for a time interval called SIFS after the frame transmission, and receives an acknowledgment frame (ACK frame) from a terminal (wireless communication device) of a communication counterpart. In this case, the time when one wireless LAN terminal occupies the wireless channel is a sum of the frame length (data frame length) of the wireless signal+SIFS time+ACK frame length. For this reason, when the signal detection module 101 detects the wireless LAN signal, the power supply period may be set to be substantially the same as the sum of the data frame length of the wireless LAN signal+SIFS time+ACK frame length.

In addition, in the period change process, results of observing the coexisting wireless communication system for a long time may be used. For example, when a time occupancy of the wireless channel of the wireless communication system is obtained based on such observation results, the power supply period may be set to be substantially the same as the time occupancy.

In the period change process, the carrier sense period may be changed and then the power supply period may be changed based on the changed carrier sense period and the ratio N, or the power supply period may be changed and then the carrier sense period may be changed based on the changed power supply period and the ratio N.

When the period change process is executed as described above, the carrier sense period and the power supply period can be dynamically changed, but control to return the carrier sense period and the power supply period thus changed to initial values at each certain time may be further executed.

Figure 9:
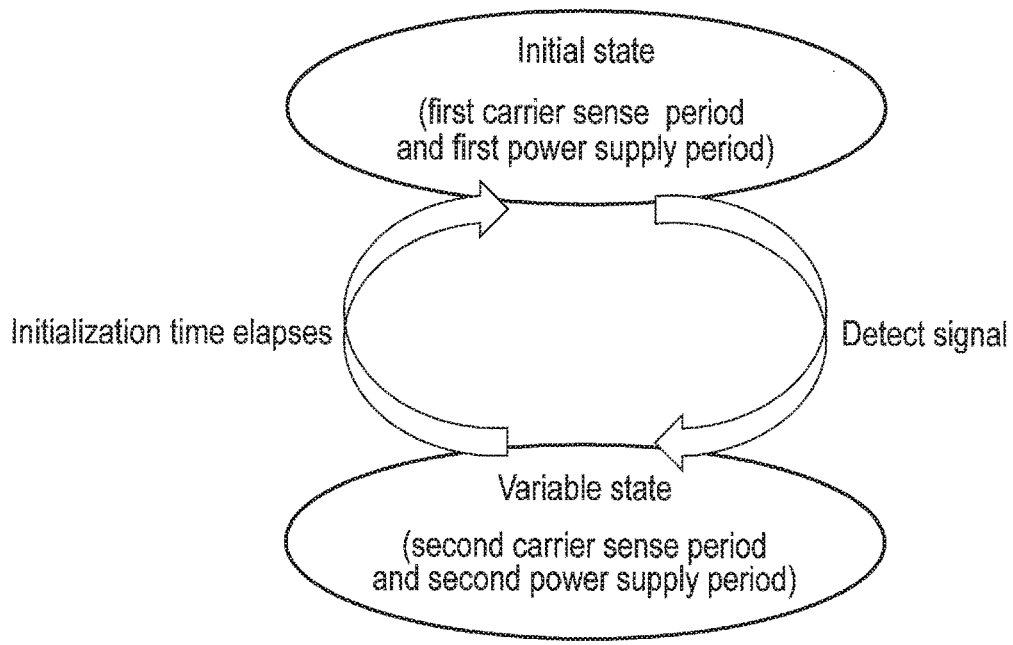
FIG. 9 is a diagram illustrating state transition of the wireless power supply device in a case of returning the carrier sense period and the power supply period to initial values at each certain time.

The state transition of the wireless power supply device 10 in a case of returning the carrier sense period and the power supply period to initial values at each certain time will be described below with reference to FIG. 9. The state of the wireless power supply device 10 includes an initial state and a variable state.

The initial state is indicative of a state of operating based on the first carrier sense period and the first power supply period (i.e., period obtained by multiplying the first carrier sense period by the ratio N) set as initial values.

In contrast, the variable state is indicative of a state of operating based on the second carrier sense period and the second power supply period (i.e., period obtained by multiplying the second carrier sense period by the ratio N) changed by the period change process.

First, in a case where the state of the wireless power supply device 10 is the initial state, for example, when the above-described period change process is executed based on the wireless signal detected by the signal detection module 101, the state of the wireless power supply device 10 transitions from the initial state to the variable state. In this case, the first carrier sense period is changed to the second carrier sense period, and the first power supply period is changed to the second power supply period.

Next, when a predetermined time (hereinafter referred to as an initialization time) elapses after the initial state transitions to the variable state (i.e., the carrier sense period and the power supply period are changed), the state of the wireless power supply device 10 transitions from the variable state to the initial state. In this case, the second carrier sense period is changed again to the first carrier sense period, and the second power supply period is changed to the first power supply period.

According to this, even if the carrier sense period and the power supply period are changed in the wireless power supply device 10, the carrier sense period and the power supply period can be returned to the initial values after the initialization time elapses.

As an example of applying the control to return the carrier sense period and the power supply period to the initial values at each certain time, it is known that, for example, in wireless LAN conforming to IEEE802.11, the maximum time for the wireless LAN terminal to share the wireless channel is controlled with a parameter called TXOP and is a maximum of 8 ms. For this reason, in an environment of existing with the wireless LAN system at a high possibility, the signal from the wireless LAN terminal existing near the wireless power supply device 10 can be certainly detected by controlling to return the carrier sense period to a value of 8 ms or more at each initialization time.

In contrast, the frame length of the wireless LAN signal becomes, for example, 1 ms or less. For this reason, for example, in a case where the average frame length of the wireless LAN signal obtained by analyzing the wireless LAN signal detected by the signal detection module 101 is 1 ms or less when the wireless power supply device 10 is in the initial state, control to shorten the carrier sense period is executed.

According to this, carrier sense can be executed in a period of the length corresponding to the frame length of the wireless LAN signal.

According to the state transition, efficient coexistence of the wireless power supply device 10 and the wireless communication system can be implemented.

As described above, the carrier sense period and the power supply period in the present embodiment may be fixed values or dynamically changed depending on an environment (the coexisting wireless communication system or the like), but improvement of the power supply efficiency can be attempted while suppressing the interference with the coexisting wireless communication system, by making the ratio of the carrier sense period to the power supply period constant.

Second Embodiment

Next, a second embodiment will be described. In the present embodiment, parts similar to drawings used in the descriptions of the above-described first embodiment are denoted by the same reference numerals. In addition, parts different from the above-described first embodiment will be mainly explained in the following descriptions.

Figure 10:
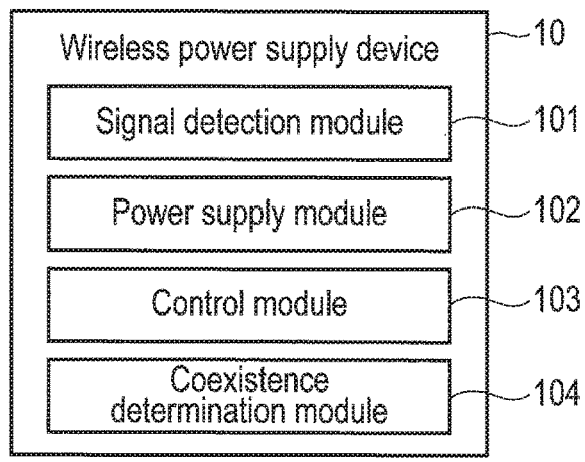
FIG. 10 is a block diagram showing an example of a functional configuration of a wireless power supply device according to a second embodiment.

FIG. 10 is a block diagram showing an example of a functional configuration of a wireless power supply device 10 according to the present embodiment. As shown in FIG. 10, the wireless power supply device 10 includes a coexistence determination module 104 as well as the signal detection module 101, the power supply module 102, and the control module 103, which are described above in the first embodiment.

In the present embodiment, for example, a part or all of the coexistence determination module 104 may be implemented by software or hardware or may be implemented as a combination of software and hardware.

The coexistence determination module 104 determines whether an existing wireless communication system exists in the vicinity of the wireless power supply device 10 (power supply area). In other words, the coexistence determination module 104 determines whether the wireless power supply device 10 and the wireless communication system exist together or not.

The present embodiment is different from the above-described first embodiment with respect to a feature of controlling the ratio N of the power supply period to the carrier sense period based on the determination results of the coexistence determination module 104.

An example of a procedure of the wireless power supply device 10 according to the present embodiment will be described below with reference to the flowchart of FIG. 11.

First, processes in steps S11 to S15 corresponding to the processes in steps S1 to S5 shown in FIG. 6 are executed.

When it is determined in step S15 that the signal undetection period reaches the carrier sense period (YES in step S15), the coexistence determination module 104 executes a coexistence determination process of determining whether the wireless power supply device 10 exists together with the wireless communication system or not (step S16). Results of the coexistence determination process include "coexistence" indicating that the wireless power supply device 10 exists together with the wireless communication system and "non-coexistence" indicating that the wireless power supply device 10 does not exist together with the wireless communication system.

The coexistence determination process executed in step S16 will be described below. The coexistence determination process is executed based on the detection results of the signal detection module 101.

In the coexistence determination process, for example, "coexistence" is determined when the power level (signal energy) of the wireless signal detected by the signal detection module 101 is a threshold value or more. In addition, in the coexistence determination process, "coexistence" may be determined when the frequency (number of times) of detection or the detection time of the wireless signal are threshold values or more.

Furthermore, the wireless signal detected by the signal detection module 101 may be analyzed (demodulated), and "coexistence" or "non-coexistence" may be determined based on the analysis results, statistical amounts of the analysis results, or the like.

More specifically, when it is determined that wireless signals from the wireless communication device having specific ID assigned thereto are continuous, by demodulating header parts of the wireless signals, it may be estimated that the wireless communication device exists near the wireless power supply device 10 and "coexistence" may be determined. In contrast, uncontinuous (i.e., single) wireless signals from a wireless communication device having quite different ID assigned thereto are detected, it is assumed that the wireless communication device is not in a stationary coexistence state (environment) and the "non-coexistence" can be determined.

Furthermore, a demodulation success rate (i.e., a rate of correctly demodulating a frame) is acquired by demodulating and statistically analyzing the data part of the wireless signal and, if the demodulation success rate is a threshold value or more, it can be estimated that a wireless power supply device exists near the wireless power supply device 10 and "coexistence" can be determined. In contrast, when the demodulation success rate is less than the threshold value, it can be estimated that, for example, a wireless signal hidden in noise and coming from a remote site is detected, and "non-coexistence" can be determined.

In the coexistence determination process, as described above, "coexistence" or "non-coexistence" is determined based on at least one of the wireless signal detection results of the signal detection module 101, the results of demodulating the header part of the wireless signal, and the results of demodulating the data part of the wireless signal.

The coexistence determination module 104 is different from the signal detection module 101 with respect to a point that the signal detection module 101 detects existence of the wireless signal (i.e., whether the wireless signal exists or not) while the coexistence determination module 104 determines whether the vicinity of the wireless power supply device 10 is an environment where the existing wireless communication system physically exists or not.

When the process in step S16 is executed, the processes in steps S17 and S18 corresponding to the processes in steps S6 and S7 shown in FIG. 6 are executed.

When it is determined in step S18 that the power transmission period reaches the power supply period (YES in step S18), the control module 103 changes (controls) the ratio of the power supply period to the carrier sense period, based on the results of the process in step S16 (step S19).

More specifically, the results of the process in step S16 (i.e., the determination results of the coexistence determination process) include "coexistence" or "non-coexistence" as described above and, it is assumed that, for example, when the current ratio (initial value) is referred to as ratio N1, ratio N12 is preset to the "coexistence" and ratio N13 is preset to the "non-coexistence".

Thus, when "coexistence" is determined in step S16, the control module 103 changes the ratio N11 of the power supply period to the carrier sense period to the ratio N12. In contrast, when "non-coexistence" is determined in step S16, the control module 103 changes the ratio N11 of the power supply period to the carrier sense period to the ratio N13.

The ratio N13 is set to a value larger than the ratio N12. According to this, since the wireless communication system (wireless communication device) with which the wireless power supply device 10 may interfere exists in the vicinity, in the "coexistence", the power supply period can be shortened and the interference can be suppressed. In contrast, since the wireless communication system (wireless communication device) with which the wireless power supply device 10 may interfere does not exist in the vicinity, in the "non-coexistence", the power supply period can be extended and the power supply efficiency can be improved.

Figure 11:
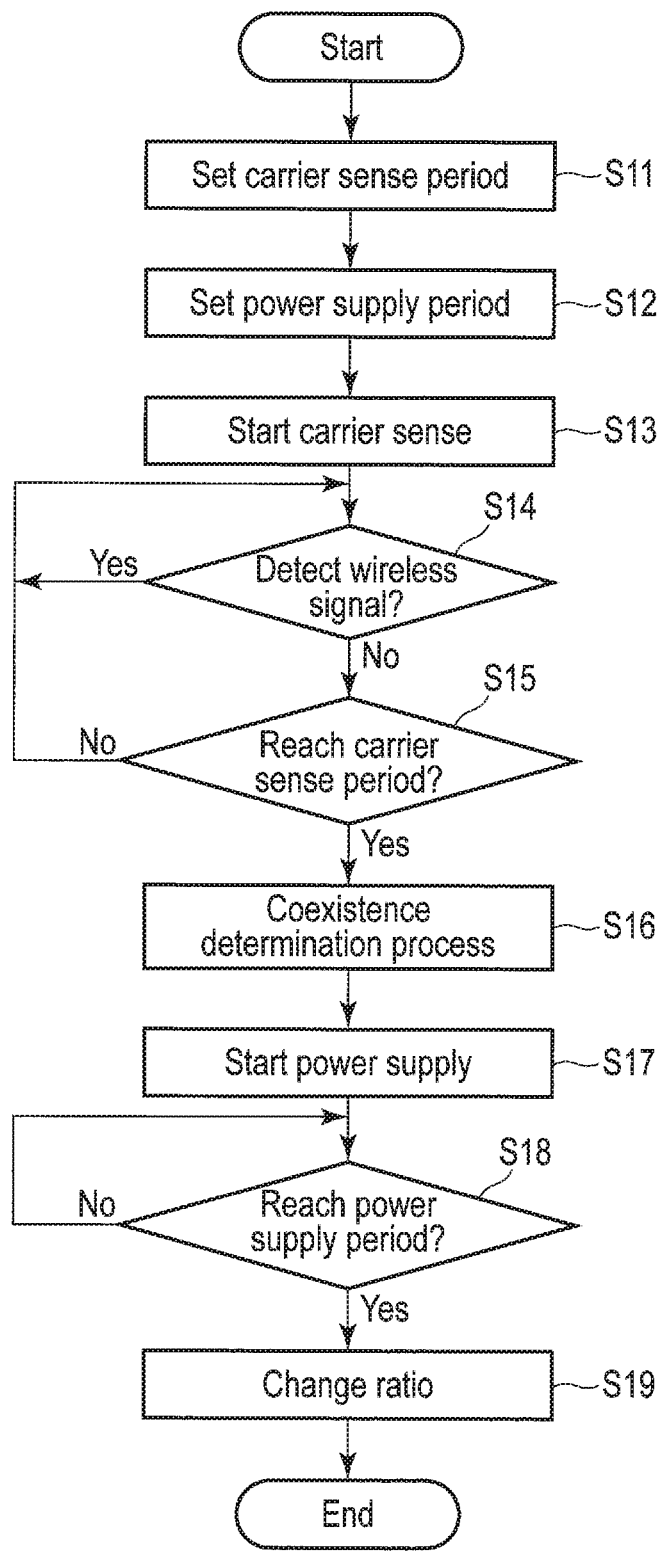
FIG. 11 is a flowchart showing an example of a procedure of the wireless power supply device.

The processes shown in FIG. 11 are periodically repeated similarly to the above-described processes shown in FIG. 6, and the ratio N12 or the ratio N13 changed in step S19 is used in the process shown in FIG. 11 to be next executed (i.e., setting of the power supply period).

In FIG. 11, the coexistence determination process is executed before the power supply is started, but the coexistence determination process may be executed after the power supply is started.

In addition, since the existence of the wireless communication device (i.e., whether the wireless power supply device 10 exists together with the wireless communication system or not) is considered to be changed as the time elapses, the coexistence determination process is desirably executed every time the above-described process shown in FIG. 11 is executed (i.e., the coexistence determination process is executed every time the detection results are obtained at the signal detection module 101). For example, however, the coexistence determination process may be executed in a predetermined time by storing the detection results of the signal detection module 101 or the coexistence determination process may be executed after the processes shown in FIG. 11 are repeated at a plurality of times.

In the present embodiment, as described above, it is determined whether the wireless power supply device 10 exists together with the wireless communication system or not (i.e., "existence" or "co-existence") based on the wireless signal transmitted in the wireless communication system, and the ratio N11 (first ratio) of the power supply period to the carrier sense period is changed based on the determination results.

More specifically, the ratio N11 is changed to the ratio N12 (third ratio) when "coexistence" is determined, and the ratio N11 is changed to the ratio N13 (fourth ratio) when "non-coexistence" is determined. In this case, the ratio N13 is larger than the ratio N12.

In addition, the coexistence determination process is executed based on at least one of the wireless signal detection results, the results of demodulating the header part of the wireless signal, and the results of demodulating the data part of the wireless signal.

In the present embodiment, both the suppression of the interference with the wireless communication system and improvement of the power supply efficiency can be implemented since the carrier sense period and the power supply period can be set based on an appropriate ratio corresponding to existence or non-existence of the wireless communication system (wireless communication device), by the configuration.

In the present embodiment, as described above, the ratio of the power supply period to the carrier sense period can be changed, but control to return the changed ratio to the initial value at each certain time may be further executed.

The state transition of the wireless power supply device 10 in a case of returning the ratio to the initial value at each certain time will be described below with reference to FIG. 12. The state of the wireless power supply device 10 includes an initial state, a coexistence state, and a non-existence state.

The initial state is indicative of a state of operating based on the ratio N11 set as the initial value. The coexistence state is indicative of a state of operating based on the above-described ratio N12. The non-coexistence state is indicative of a state of operating based on the above-described ratio N13.

When the state of the wireless power supply device 10 is the initial state, the first carrier sense period and the first power supply period obtained by multiplying the first carrier sense period by the ratio N11 are set, and the carrier sense and the power supply are executed based on the first carrier sense period and the first power supply period.

It is assumed here that, for example, "coexistence" is determined by the coexistence determination module 104 when the state of the wireless power supply device 10 is the initial state. In this state, the ratio N11 is changed to the ratio N12, and the state of the wireless power supply device 10 transitions from the initial state to the coexistence state. According to this, a second carrier sense period and a second power supply period obtained by multiplying the second carrier sense period by the ratio N12 are set, and the carrier sense and the power supply are executed based on the second carrier sense period and the second power supply period.

In addition, when a predetermined time (hereinafter referred to as an initialization time) elapses after the initial state transitions to the coexistence state (i.e., the ratio N11 is changed to the ratio N12) as described above, the state of the wireless power supply device 10 transitions from the coexistence state to the initial state (i.e., the ratio N12 is changed again to the ratio N1).

In contrast, it is assumed that, for example, "non-coexistence" is determined by the coexistence determination module 104 when the state of the wireless power supply device 10 is the initial state. In this state, the ratio N11 is changed to the ratio N13, and the state of the wireless power supply device 10 transitions from the initial state to the non-coexistence state. According to this, a third carrier sense period and a third power supply period obtained by multiplying the third carrier sense period by the ratio N13 are set, and the carrier sense and the power supply are executed based on the third carrier sense period and the third power supply period.

In addition, when the initialization time elapses after the initial state transitions to the non-coexistence state (i.e., the ratio N11 is changed to the ratio N13) as described above, the state of the wireless power supply device 10 transitions from the non-coexistence state to the initial state (i.e., the ratio N13 is changed again to the ratio N1).

According to this, even if the ratio of the power supply period to the carrier sense period is changed in the wireless power supply device 10, the ratio can be returned to the initial value after the initialization time elapses.

For example, when the state of the wireless power supply device 10 is the coexistence state, communications at the wireless communication system (wireless communication device) are often ended. In this case, "non-coexistence" is determined in the periodically executed coexistence determination process before the state of the wireless power supply device 10 transitions from the coexistence state to the initial state. In such a case, the state of the wireless power supply device 10 transitions from the coexistence state to the non-existence state. According to this, in an environment which does not interfere with the wireless communication system, the coexistence state transitions to the non-coexistence state even if the state of the wireless power supply device 10 is the coexistence state, and therefore the carrier sense period and the power supply period can be controlled such that the power supply efficiency is improved. Even when the state of the wireless power supply device 10 transitions from the coexistence state to the non-coexistence state, the state of the wireless power supply device 10 transitions from the non-coexistence state to the initial state if the initialization time elapses after the state transitions from the coexistence state to the non-coexistence state. In addition, when "coexistence" is determined in the coexistence determination process before the state of the wireless power supply device 10 transitions from the coexistence state to the initial state, the coexistence state is maintained.

Similarly, for example, when the state of the wireless power supply device 10 is the non-coexistence state, communications at the wireless communication system (wireless communication device) are often started. In this case, "coexistence" is determined in the periodically executed coexistence determination process before the state of the wireless power supply device 10 transitions from the non-coexistence state to the initial state. In such a case, the state of the wireless power supply device 10 transitions from the non-coexistence state to the existence state. According to this, in a case where the interference with the wireless communication system may occur, the non-coexistence state transitions to the coexistence state even if the state of the wireless power supply device 10 is the non-coexistence state, and therefore the carrier sense period and the power supply period can be controlled such that the interference is suppressed. Even when the state of the wireless power supply device 10 transitions from the non-coexistence state to the coexistence state, the state of the wireless power supply device 10 transitions from the coexistence state to the initial state if the initialization time elapses after the state transitions from the non-coexistence state to the coexistence state. In addition, when "non-coexistence" is determined in the coexistence determination process before the state of the wireless power supply device 10 transitions from the non-coexistence state to the initial state, the non-coexistence state is maintained.

For example, the above-described initialization time may be determined based on the specifications of the wireless communication system which may exist together with the wireless power supply device 10 or may be determined based on the specifications of the wireless power supply device 10.

For example, when the wireless communication system which may exist together with the wireless power supply device 10 is the wireless LAN system, a delay time which is permissible for a new wireless communication device (wireless LAN terminal) to connect to the base station is assumed to be several seconds, and the initialization time is desirably set to substantially the same order as the permissible delay time.

In addition, the wireless power supply device 10 is often configured to periodically execute propagation channel estimation for the power reception device 20 to optimize electromagnetic waves for power supply (i.e., electromagnetic waves to transmit the power). In this case, the initialization time may be determined so as to transition to the initial state in substantially the same cycle as the propagation channel estimation.

Furthermore, for example, when the wireless communication device constituting the wireless communication system periodically transmits a beacon signal, the initialization time may be determined to transition to the initial state in substantially the same cycle as the beacon signal.

In addition, it has been described with reference to FIG. 12 that the initialization time to transition from the coexistence state to the initial state is the same as the initialization time to transition from the non-coexistence state to the initial state, but the initialization times may be different.

In the present embodiment, the ratio N13 in the non-coexistence state is larger than the ratio N12 in the existence state, but the ratio N13 may be, for example, infinite. According to this, when "non-existence" is determined in the coexistence determination process, power supply can be performed at any time at the wireless power supply device 10 since interference with the wireless communication system cannot occur. In contrast, a new wireless communication device may start communications while the power supply is executed but, in this case, the wireless signal transmitted by the wireless communication device can be detected by transitioning from the non-coexistence state to the initial state when the initialization time elapses.

In addition, the ratio N11 shown in FIG. 12 is set to be smaller than at least the ratio N13. More specifically, the ratio N11 may be the same as the ratio N12 in the coexistence state or may be a value between the ratio N12 and the ratio N13. Furthermore, it has been described that the ratio N12 is one value but, for example, a plurality of ratios N12 corresponding to the analysis results of the wireless signal, and the like may be prepared. According to this, when the state of the wireless power supply device 10 transitions to the coexistence state, the wireless power supply device 10 can be made to operate based on an appropriate ratio corresponding to the wireless communication system determined to exist together.

In addition, it has been described with reference to FIG. 12 that the first carrier sense period is set in the initial state, the second carrier sense period is set in the coexistence state, and the third carrier sense period is set in the non-coexistence state, but the first to third carrier sense periods may be the same period or different periods.

Furthermore, it has been described that the coexistence determination process is periodically executed in the present embodiment but, for example, when the state of the wireless power supply device 10 is the initial state, the coexistence determination process may be executed after the carrier sense and the power supply in the initial state (i.e., operations based on the ratio N11) are repeated at a predetermined number of times to certainly determine whether the wireless power supply device 10 exists together with the wireless communication system or not. In contrast, the coexistence determination process may be executed after the carrier sense and the power supply in the initial state are executed once.

When the state of the wireless power supply device 10 is the coexistence state and the non-coexistence state, the coexistence determination process may also be executed after the carrier sense and the power supply are repeated at a predetermined number of times or the coexistence determination process may also be executed after the carrier sense and the power supply are executed once.

The coexistence determination process may be executed only when the wireless power supply device 10 is in the initial state and may not be executed when the wireless power supply device 10 is in the coexistence state and the non-coexistence state.

In at least one embodiment described above, an electronic device and a method capable of acquiring both suppression of the interference with an existing wireless communication system and a high power supply efficiency can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
processor circuitry configured to:
control a signal detection module to detect a wireless signal of a wireless communication system; and
control a power supply module to supply power to a power reception device with electromagnetic waves,
wherein
when the wireless signal is not detected during a first period, the power is supplied during a second period,
when the wireless signal is not detected during a third period different from the first period, the power is supplied during a fourth period different from the second period, and
a second ratio of the fourth period to the third period is the same as a first ratio of the second period to the first period.

2. The electronic device of claim 1, wherein
when a period for detecting the wireless signal is changed from the first period to the third period, the period for supplying the power is changed from the second period to the fourth period, and
when the period for supplying the power is changed from the second period to the fourth period, the period for detecting the wireless signal is changed from the first period to the third period.

3. The electronic device of claim 1, wherein
when the period for detecting the wireless signal is changed from the first period to the third period and the period for supplying the power is changed from the second period to the fourth period and then a determined time elapses, the period for detecting the wireless signal is changed again from the third period to the first period and the period for supplying the power is changed again from the fourth period to the second period.

4. The electronic device of claim 1, wherein
the first ratio is changed, based on whether the electronic device exists together with the wireless communication system or not.

5. The electronic device of claim 4, wherein
when the electronic device exists together with the wireless communication system, the first ratio is changed to a third ratio,
when the electronic device does not exist together with the wireless communication system, the first ratio is changed to a fourth ratio, and
the fourth ratio is larger than the third ratio.

6. The electronic device of claim 5, wherein
when a predetermined period elapses after the first ratio is changed to the third ratio, the third ratio is changed again to the first ratio, and
when a predetermined period elapses after the first ratio is changed to the fourth ratio, the fourth ratio is changed again to the first ratio.

7. The electronic device of claim 5, wherein
when the electronic device does not exist together with the wireless communication system after the first ratio is changed to the third ratio, the third ratio is further changed to the fourth ratio.

8. The electronic device of claim 5, wherein
when the electronic device exists together with the wireless communication system after the first ratio is changed to the fourth ratio, the fourth ratio is further changed to the third ratio.

9. The electronic device of claim 4, wherein
whether the electronic device exists together with the wireless communication system or not is determined based on at least one of a detection result of the wireless signal, a result of demodulating a header part of the wireless signal, and a result of demodulating a data part of the wireless signal.

10. The electronic device of claim 1, wherein
the wireless communication system is a wireless communication system conforming to IEEE802.11.

11. An electronic device comprising:
processor circuitry configured to control a power reception module to receive power transmitted with electromagnetic waves by a wireless power supply device; and
a power storage unit which stores the received power,
wherein
when a wireless signal of a wireless communication system is not detected at the wireless power supply device during a first period, the power is received during a second period,
when the wireless signal of the wireless communication system is not detected at the wireless power supply device during a third period different from the first period, the power is received during a fourth period different from the second period, and
a second ratio of the fourth period to the third period is the same as a first ratio of the second period to the first period.

12. A method comprising:
detecting a wireless signal of a wireless communication system; and supplying power to a power reception device with electromagnetic waves,
wherein
the supplying power includes:
supplying the power during a second period when the wireless signal is not detected during a first period; and
supplying the power during a fourth period different from the second period when the wireless signal is not detected during a third period different from the first period, and
a second ratio of the fourth period to the third period is the same as a first ratio of the second period to the first period.

* * * * *